United States Patent [19]

Iizuka et al.

[11] Patent Number: 4,467,602
[45] Date of Patent: Aug. 28, 1984

[54] SPLIT ENGINE CONTROL SYSTEM

[75] Inventors: Haruhiko Iizuka, Yokosuka; Fukashi Sugasawa, Yokohama, both of Japan

[73] Assignee: Nissan Motor Company, Limited, Yokohama, Japan

[21] Appl. No.: 436,517

[22] Filed: Oct. 25, 1982

[30] Foreign Application Priority Data

Oct. 28, 1981 [JP] Japan ................... 56-172376

[51] Int. Cl.³ ............... F01N 3/20; F02D 17/00
[52] U.S. Cl. .............................. 60/276; 60/278; 60/285; 60/301
[58] Field of Search ............ 60/276, 278, 285, 301; 123/198 F

[56] References Cited

U.S. PATENT DOCUMENTS

| 4,165,610 | 8/1979 | Iizuka | 60/285 |
| 4,245,471 | 1/1981 | Sugasawa et al. | |
| 4,256,074 | 3/1981 | Sugasawa | 60/276 |
| 4,263,782 | 4/1981 | Matsumoto | 60/276 |
| 4,274,373 | 6/1981 | Sugasawa | 60/276 |
| 4,320,726 | 3/1982 | Etoh | 123/198 F |
| 4,344,393 | 8/1982 | Etoh | 123/198 F |

Primary Examiner—Douglas Hart
Attorney, Agent, or Firm—Schwartz, Jeffery, Schwaab, Mack, Blumenthal & Koch

[57] ABSTRACT

A split engine control system operates a multiple cylinder internal combustion engine by using only some of the plurality of cylinders under light load conditions. The total number of cylinders are split into a first cylinder group which is always activated during engine operation and a second cylinder group which is deactivated under light load conditions. The engine is provided with an exhaust passage which consists of first and second upstream exhaust passages connected to the first and second cylinder group, respectively, and a common downstream exhaust passage. An exhaust gas sensor and a first catalytic converter are disposed in the first upstream exhaust passage, and a second catalytic converter is disposed in the common downstream exhaust passage. A temperature sensor is provided in the second catalytic converter. When the temperature of the second catalytic converter is above a certain level during the partial cylinder mode, the engine is feedback controlled by a signal from the exhaust gas sensor and the exhaust gases are purified by the first catalytic converter. When the temperature is below the level during the partial cylinder mode, the air-fuel mixture is enriched with respect to the stoichiometric point so as to promote reduction of the NOx component of the exhaust gases in the first catalytic converter and oxidation of the remaining HC and CO components in the second catalytic converter.

6 Claims, 7 Drawing Figures

SPLIT ENGINE CONTROL SYSTEM

BACKGROUND OF THE INVENTION

1. Field of the Invention

The present invention relates to a split engine control system which operates a multiple cylinder internal combustion engine using only some of the cylinders under light load conditions, and more particularly to an emission control system for operating the engine in a partial cylinder mode of operation.

2. Discussion of Related Art

It is well known in the art that fuel economy is achieved under light load conditions by operating a multiple cylinder internal combustion engine using only some of the cylinders and allowing these cylinders to operate at their maximum efficiency. When the engine load is relatively heavy, the engine is operated with all of the cylinders. The total number of cylinders is thus split into a first cylinder group which is always activated during the engine operation and a second cylinder group which is deactivated and allowed to pump fresh air therethrough under light load conditions. This method of engine operation is known as a split engine control system.

In order to reduce exhaust gas emissions of the engine employing such system, various emission control systems have been presented by the same inventors of the present invention and others. For example, U.S. Pat. No. 4,256,074, issued May 17, 1981, discloses an emission control system having an exhaust passage which consists of first and second upstream passages connected to the first and second cylinder groups, respectively, and a common downstream passage. A first three-way catalytic converter is disposed in the first exhaust passage with a first exhaust gas sensor, and a second three-way catalytic converter is disposed in the common downstream passage with a second exhaust gas sensor. When the engine is operated in a full cylinder mode, the engine is feedback controlled by a signal from the second exhaust gas sensor so as to maintain the ratio of the air-fuel mixture at a stoichiometric point, and the exhaust gases are purified by both three-way catalytic converters. When the engine is operated in a partial cylinder mode, the engine is feedback controlled by a signal from the first exhaust gas sensor, and the exhaust gases from the activated first cylinder group are purified by the first three-way catalytic converter.

But this arrangement has a transient problem when the engine is switched from partial to full cylinder mode, because the temperature of the second catalytic converter may be lowered below a minimum active temperature by fresh air pumped through the deactivated second cylinder group during the partial cylinder mode and the second catalytic converter may become inactive. On the other hand, U.S. Pat. No. 4,245,471, issued Jan. 20, 1981, discloses an emission control system having the same exhaust passage system as described above except using only one exhaust gas sensor which is disposed in the common downstream exhaust passage upstream of the second three-way catalytic converter. When the engine is operated in a full cylinder mode, the engine is feedback controlled by a signal from the exhaust gas sensor and the exhaust gases are purified by both first and second three-way catalytic converters. When the engine is operated in a partial cylinder mode, the air-fuel mixture supplied to the activated first cylinder group is enriched with respect to the stoichiometric point. This allows the first three-way catalytic converter to promote the reduction of the NOx component of the exhaust gases, and allows the second three-way catalytic converter to promote the oxidation of the remaining HC and CO components of the exhaust gases mixed with the fresh air. The heat of reaction in the second catalytic converter keeps its temperature high and keeps it active during the partial cylinder mode.

But this arrangement has a disadvantage on fuel economy during the partial cylinder mode as compared with the first arrangement, because the rich burn operation requires enriched air-fuel mixture with respect to the stoichiometric point.

SUMMARY OF THE INVENTION

Accordingly, an object of the present invention is to provide a control system which has a minimum of transient problems when the engine is switched from partial to full cylinder mode.

Another object of the present invention is to provide a control system which has good fuel economy during the partial cylinder mode.

The present invention contemplates the use of first and second upstream exhaust passages for passing the gases exhausted from the first and second cylinder groups, respectively, to a common joint to which a common downstream exhaust passage is connected for passing the gases therethrough to the atmosphere, and the use of a first catalytic converter disposed in the first upstream exhaust passage, a second catalytic converter disposed in the common downstream exhaust passage and an exhaust gas sensor disposed in the first upstream exhaust passage. A temperature sensor is provided in the second catalytic converter. A split engine control unit is provided to operate the engine under light load conditions in a partial cylinder mode in which only the first cylinder group is activated and the second cylinder group is deactivated and allowed to pump air therethrough, and to operate the engine under relatively heavy load conditions in a full cylinder mode in which both first and second cylinder groups are activated. A feedback control unit responsive to a signal from the exhaust gas sensor is provided to maintain the ratio of the air-fuel mixture supplied to the first cylinder group at the stoichiometric point. A means responsive to the temperature sensor is provided to disable the feedback control unit and to control the ratio of the air-fuel mixture supplied to the first cylinder group at a point which lies to the rich side of the stoichiometric point when the temperature of the second catalytic converter is below a predetermined level during the partial cylinder mode.

A further object of the present invention is therefore to normally use the feedback control system, which provides good fuel economy, during the partial cylinder mode and switch to the rich burn operation only when the temperature of the second catalytic converter is below the predetermined level in order to avoid the transient problem.

DETAILED DESCRIPTION OF THE PREFERRED EMBODIMENT

Figure 1:
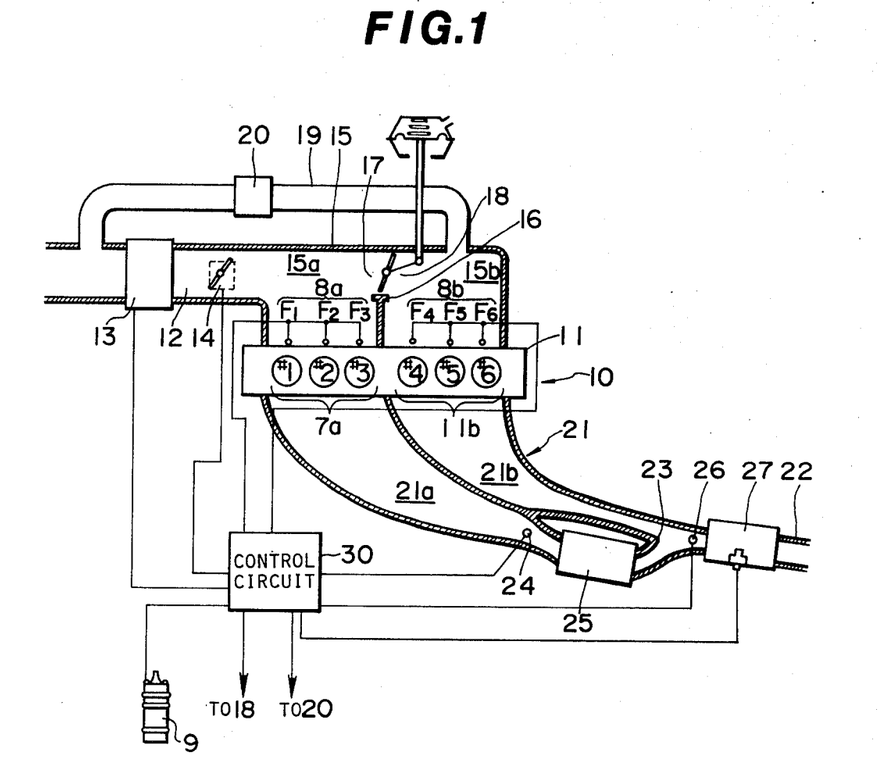
FIG. 1 is a schematic view of a preferred embodiment according to the present invention.

Referring now to the drawings in detail, FIG. 1 schematically illustrates a preferred embodiment according to the present invention.

An internal combustion engine 10 has, for the purpose of the disclosure, six cylinders No. 1 through No. 6, which are split into a first cylinder group 7a including the cylinders No. 1 to No. 3 and a second cylinder group 7b including the cylinders No. 4 to No. 6. The first and second cylinder groups 7a and 7b are provided with a first fuel injector group 8a including fuel injectors F1 to F3 and a second fuel injector group 8b including fuel injectors F4 to F6, respectively, controlled by a control circuit 30.

As will be described later, when the engine load is light, the engine 10 is operated in a partial cylinder mode in which only the first cylinder group 7a is activated and the second cylinder group 7b is deactivated by disabling the second fuel injector group 8b. When the engine load is relatively heavy, the engine 10 is operated in a full cylinder mode in which both first and second cylinder groups 7a and 7b are activated by enabling both first and second fuel injector groups 8a and 8b.

The engine 10 has an air induction passage 12 provided therein with an airflow sensor 13 and a throttle valve 14. The airflow sensor 13 produces an air quantity signal which represents the quantity of air passing through the throttle valve 14. The air quantity signal is inputted into the control circuit 30 with an engine speed signal, based on an ignition timing signal from an ignition coil 9, which represents a rotational speed of an engine crank shaft. The air induction passage 12 is connected downstream of the throttle valve 14 to an intake manifold 15 which is divided by a partition 16 into first and second intake passages 15a and 15b leading to the first and second cylinder groups 7a and 7b, respectively. The partition 16 has an opening 17 therein. The opening 17 is provided therein with a first stop valve 18 which normally opens so as to permit the flow of air therethrough into the activated second cylinder group 7b and closes during the partial cylinder mode so as to shut off the flow of air coming through the throttle valve 14 into the deactivated second cylinder group 7b.

In order to minimize the pumping losses during the partial cylinder mode of operation, fresh air, at substantially atmospheric pressure, is introduced into the deactivated second cylinder group 7b through a bypass passage 19 which connects the air induction passage 12 upstream of the airflow sensor 13 and the second intake passage 15b downstream of the first stop valve 18.

The flow of fresh air through the bypass passage 19 is controlled by a second stop valve 20 provided therein which normally closes so as to shut off the flow of fresh air and opens during the partial cylinder mode so as to introduce the fresh air into the deactivated second cylinder group 7b as described above. The first and second stop valves 18 and 20 are controlled by the control circuit 30.

On the other hand, the engine 10 also has an exhaust manifold 21 which is divided into first and second upstream exhaust passages 21a and 21b leading from the first and second cylinder groups 7a and 7b, respectively. The first and second upstream exhaust passages 21a and 21b merge into a common downstream exhaust passage 22 at a common junction 23. A first exhaust gas sensor 24 and a first three-way catalytic converter 25 are disposed in the first upstream exhaust passage 21a so as to purify the exhaust gases from the first cylinder group 7a. A second exhaust gas sensor 26 and a second three-way catalytic converter 27 are disposed in the common downstream exhaust passage 22 so as to purify the exhaust gases from both first and second cylinder groups during the full cylinder mode. The exhaust gas sensors 24 and 26 detect the concentration of oxygen in the exhaust gases so as to correct the ratio of the air-fuel mixture by a feedback control mechanism to the stoichiometric point where the three-way catalytic converters can simultaneously oxidize the HC and CO components and deoxidize the NOx component in the exhaust gases.

A temperature sensor 28 is provided in the second three-way catalytic converter 27 so as to detect its temperature, which is likely to fall below the minimum active temperature of three-way catalytic converters by the fresh air pumped through the deactivated second cylinder mode 7b during the partial cylinder mode.

Figure 2:
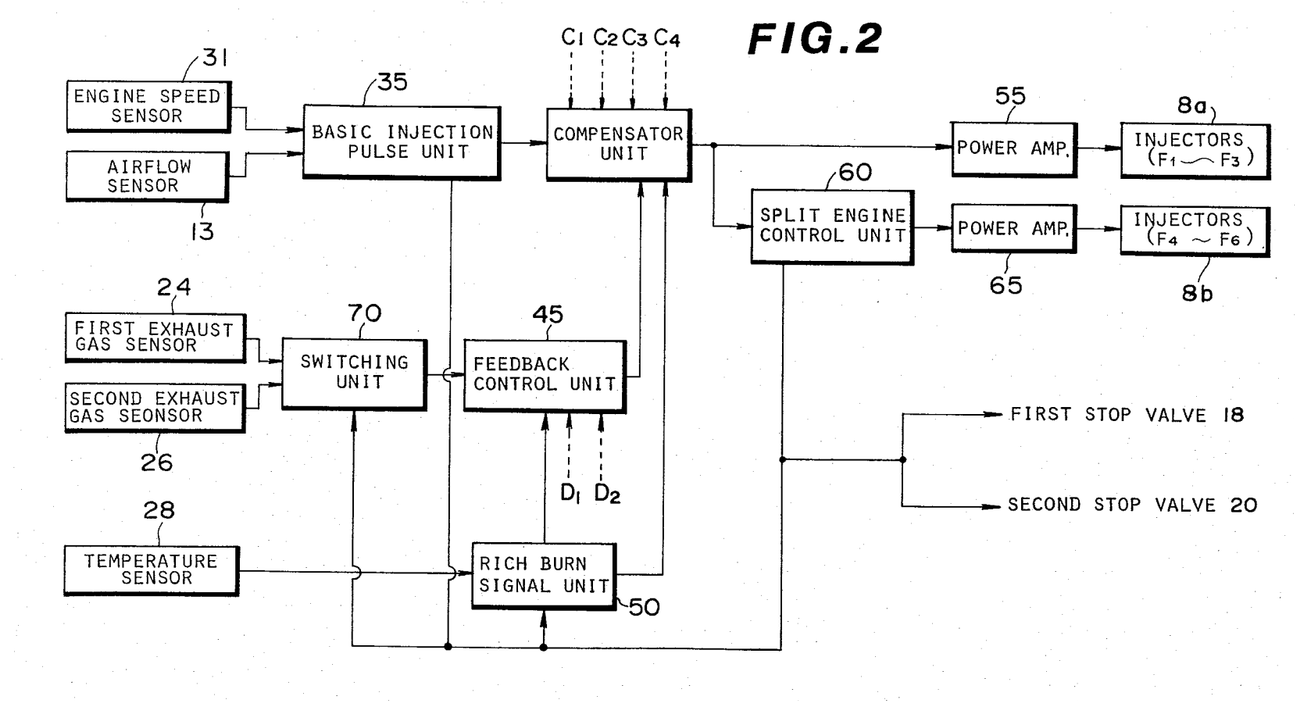
FIG. 2 is a circuit diagram associated with the embodiment of FIG. 1.

FIG. 2 is an illustration of the control circuit 30 of the present invention. A basic injection pulse unit 35 takes its inputs from an engine speed sensor 31 and the airflow sensor 13, and, based on these inputs, computes data to obtain the air quantity taken in per engine crankshaft revolution. The basic injection pulse unit 35 generates a basic injection pulse in synchronism with engine crankshaft revolution having a pulse width proportional to the computed air quantity which represents the engine load.

The basic injection pulse is supplied to a compensator unit 40, and the pulse width thereof is compensated by various signals, such as, an engine coolant temperature signal, C1, a voltage signal of the vehicle battery, C2, a full or a close position signal of the throttle valve 14, C3, and an engine cranking signal, C4, as well known in the art. The pulse width is also compensated by signals from a feedback control unit 45 or a rich burn signal unit 50 as will be described later. The compensator unit 40 outputs the compensated basic injection pulse as a fuel injection pulse.

The fuel injection pulse is supplied to the first fuel injector group 8a (injectors F1 to F3) through a power amplifier 55 so as to activate the first cylinder group 7a during the engine operation. The fuel injection pulse is also supplied to the second fuel injector group 8b (injectors F4 to F6) through a split engine control unit 60 and a power amplifier 65.

The split engine control unit 60 determines whether the engine should be operated in a full or a partial cylinder mode, and generates a low level mode signal which represents a full cylinder mode of operation and generates a high level mode signal which represents a partial cylinder mode of operation. The split engine control unit 60 includes means for detecting the engine load based on the pulse width of the fuel injection pulse which represents engine load, and also includes means for distinguishing whether the detected engine load is above or below a predetermined reference level. When the detected engine load is above the reference level, the split engine control unit 60 passes the fuel injection pulse to the second fuel injector group 8b through the power amplifier 55 so as to activate the second cylinder group 7b, and generates the low level full cylinder mode signal. And when the detected engine load is below the reference level, the split engine control unit 60 terminates the fuel injection pulse to the second fuel injector group 8b so as to deactivate the second cylinder group 7b, and generates the high level partial cylinder mode signal. The full or partial cylinder mode signals are provided on an output line 61 from the split engine control unit to a switch unit 70, the rich burn signal unit 50, and the basic injection pulse unit 35.

In order to prevent the split engine control system from repeatedly switching between full and partial cylinder modes when the engine load repeatedly cross the reference level, the split engine control unit 60 also includes means for providing a hysteresis characteristic which permits the system to maintain the previous operational mode regardless of the slight variations of the engine load.

Figure 3:
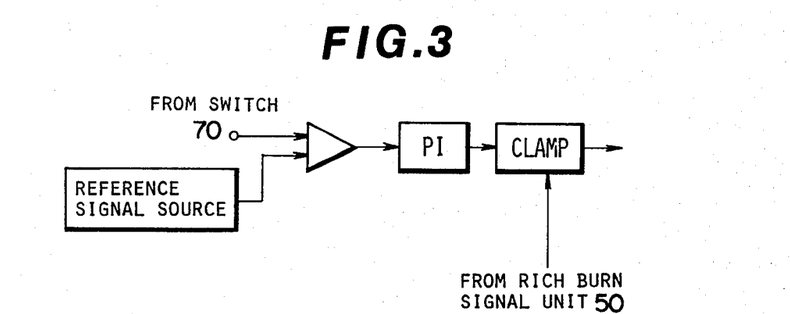
FIG. 3 is a circuit diagram of the feedback control unit shown in FIG. 2.

The feedback control unit 45 takes its input from the second exhaust gas sensor 26 or the first exhaust gas sensor 24 depending upon the switch positions of the switch unit 70 which is controlled by the cylinder mode signal from the split engine control unit 60. As shown in FIG. 3, the feedback control unit 45 includes a comparator 46 having a first input terminal connected to the output terminal of the switch unit 70 and a second input terminal connected to a reference signal source 47 which provides a reference signal corresponding to the stoichiometric point. The comparator 46 provides an output signal at one of two discrete levels depending on whether the signal from one of the exhaust gas sensors 26, 24 is above or below the reference signal, and supplies the output signal to a proportional integral controller 48. The controller 48 modifies the output signal with a predetermined proportionality factor and integration rate to minimize feedback control oscillation and improve response characteristic of the feedback control system. The controller 48 outputs the modified signal as a feedback signal to a clamping circuit 49 which is controlled by an output signal from the rich burn signal unit 50.

The feedback signal is normally supplied to the compensator unit 40 through the clamping circuit 49, and the pulse width of the basic injection pulse is compensated so as to maintain the ratio of the air-fuel mixture at the stoichiometric point where the second and/or the first three-way catalytic converters 27, 25 can promote simultaneous reduction of the NOx component and oxidation of the HC and CO components of the exhaust gases. When the high level signal is supplied to the clamping circuit 49 from the rich burn signal unit 50, the clamping circuit 49 clamps the feedback signal from the proportional integral controller 48 at a non-activating level so as to suspend the feedback control operation.

Figure 4:
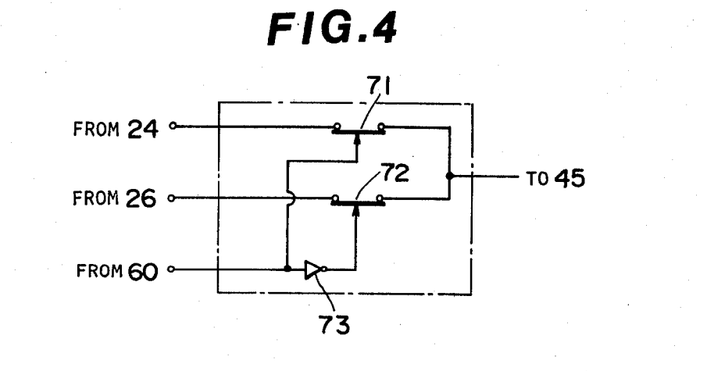
FIG. 4 is a circuit diagram of the switch unit shown in FIG. 2.

As shown in FIG. 4, the switch unit 70 includes a switch 71 which connects the feedback control unit 45 to the first exhaust gas sensor 24, and includes a switch 72 which connects the feedback control unit 45 to the second exhaust gas sensor 26. The switch 71 is directly controlled by the cylinder mode signal from the split engine control unit 60, and the switch 72 is controlled by an inverted signal of the cylinder mode signal by an inverter 73. Therefore, when the full cylinder mode signal (low level) is supplied, the feedback control unit 45 is connected to the second exhaust gas sensor 26 by the switch 72. When the partial cylinder mode signal (high level) is supplied the feedback control unit 45 is connected to the first exhaust gas sensor 24 by the switch 71.

Figure 5:
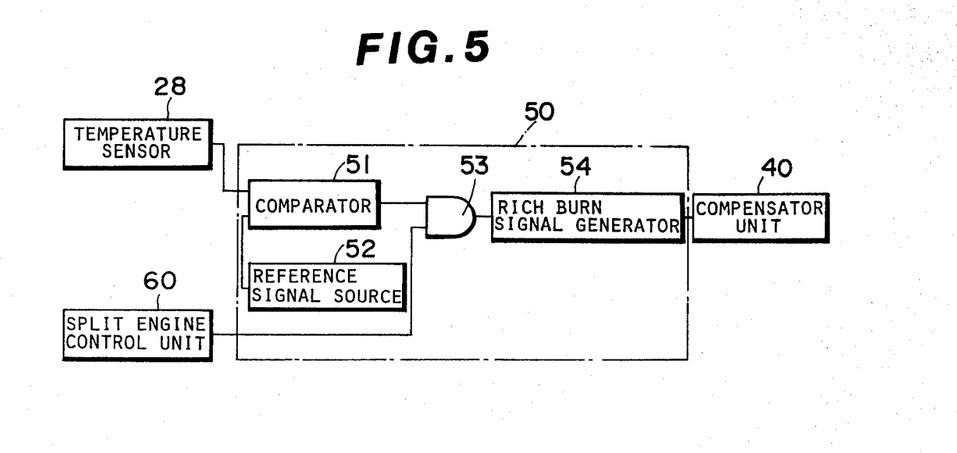
FIG. 5 is a circuit diagram of the rich burn signal unit shown in FIG. 2.

The rich burn signal unit 50 takes its input from the temperature sensor 28 which is provided in the second catalytic converter 27. As shown in FIG. 5, the rich burn signal unit 50 includes a comparator 51 having a first input terminal connected to the temperature sensor 28 and a second input terminal connected to a reference signal source 52 which provides a reference signal corresponding to a certain reference temperature which is above a minimum active temperature of the second catalytic converter 27. The comparator 51 outputs a low level signal when the temperature signal is above the reference signal, and outputs a high level signal when the temperature signal is below the reference signal. The output signal of comparator 51 is supplied to one of two input terminals of an AND gate 53. The cylinder mode signal from the split engine control unit 60 is supplied to the other input terminal of the AND gate 53. The AND gate 53 outputs a high level signal only when both input signals are high level, otherwise the AND gate 53 outputs a low level signal. The output signal of the AND gate 53 is supplied to the clamping circuit 49 of the feedback control unit 45 as described before, and also supplied to a rich burn signal generator 54. The generator 54 outputs a predetermined rich burn signal corresponding to a point which lies to the rich side of the stoichiometric point when the output signal of the AND gate 53 is a high level; otherwise the generator 54 is disconnected from the compensator unit 40 so that the rich burn signal unit has no effect on the compensator unit 40. The output signal is supplied to the compensator unit 40. When the rich burn signal is supplied to the compensator unit 40, the pulse width of the basic injection pulse is compensated so that the air-fuel mixture supplied to the engine can be enriched with respect to the stoichiometric point.

Now referring back to FIG. 2 and FIG. 1, the split engine control and the emission control systems work as follows. When the full cylinder mode signal (low level) is generated by the split engine control unit 60, the first and the second stop valves 18, 20 remain at their normal positions. The first stop valve 18 remains open so as to permit the flow of air through the throttle valve 14 into the second cylinder group 7b, and the second valve 20 remains closed to shut off the bypass passage 19 (in reference to FIG. 1). The split engine control unit 60 passes the fuel injection pulse to the second fuel injector group 8b so as to activate the second cylinder group 7b as well as the first cylinder group 7a. Thus, the engine is operated in a full cylinder mode of operation.

The full cylinder mode signal (low level) controls the switch unit 70 and the rich burn signal unit 50 as described before. The switch 70 connects the feedback control unit to the second exhaust gas sensor 26. The rich burn signal unit 50 outputs a non-activating level signal to the compensator unit 40, and outputs a low level signal to the feedback control unit 45 so that the feedback signal can be supplied to the compensator unit 40. Therefore, the engine is feedback controlled by the signal from the second exhaust gas sensor 26 which is disposed in the common downstream exhaust passage 22. The ratio of the air-fuel mixture supplied to the engine is maintained at the stoichiometric point so that the first and the second three-way catalytic converters, 25, 27 can promote simultaneous reduction of the NOx component and oxidation of the HC and CO components of the gases exhausted from the first and the second cylinder groups 7a, 7b.

On the other hand, when the partial cylinder mode signal (high level) is generated, the split engine control unit 60 stops passing the fuel injection pulse to the second fuel injector group 8b so as to deactivate the second cylinder group 7b. The first stop valve 18 closes so as to shut off the flow of air through the throttle valve 14 into the deactivated second cylinder group 7b. The second stop valve 20 opens and introduces fresh air, at substantially atmospheric pressure, through the bypass passage 19 into the deactivated second cylinder group 7b in order to minimize the pumping losses. The partial cylinder mode signal is supplied to the basic injection pulse unit 35 so as to widen the pulse width of the basic injection pulse by a factor of two, because the air through the throttle valve 14 flows only into the first cylinder group 7a and the air-quantity taken therein becomes twice as much as it was before. In order to detect the engine load correctly in spite of the twice-widened pulse width, the split engine control unit 60 causes the reference level of the engine load to be twice as high as the previous reference level. Thus, the engine is operated in partial cylinder mode.

The partial cylinder mode signal (high level) controls the switch unit 70 and the rich burn signal unit 50 as described before. The switch connects the feedback control unit 45 to the first exhaust gas sensor 24. The rich burn signal unit outputs signals to the feedback control unit 45 and the compensator unit 40 depending on the signal from the temperature sensor 28 which is provided in the second catalytic converter 27.

When the detected temperature is above the reference temperature, that is, the second catalytic converter 27 is still active, the rich burn signal unit 50 outputs a non-activating level signal to the compensator unit 40 (effectively disconnecting the rich burn signal unit 50 from the compensator unit 40), and outputs a low level signal to the feedback control unit 45 so that the feedback signal can be supplied to the compensator unit 40. Therefore, the engine is feedback controlled by the signal from the first exhaust 24 which is disposed in the first upstream exhaust passage 21a. The ratio of the air-fuel mixture supplied to the first group cylinder 7a is maintained at the stoichiometric point so that the first three-way catalytic converter 25 can promote simultaneous reduction of the NOx component and oxidation of the HC and CO components of the gases exhausted from the first cylinder group 7a. During the partial cylinder mode, the deactivated second cylinder group 7b keeps pumping out the fresh air which lowers the temperature of the second catalytic converter 27 and may cause it to be inactive when the engine is switched from partial to full cylinder mode.

In order to prevent this transient problem, when the detected temperature of the second catalytic converter 27 is below the reference temperature, that is, the second catalytic converter is not optimally active, the rich burn signal unit 50 outputs a high level signal so as to suspend the feedback control operation, and outputs the rich burn signal to the compensator unit 40. Therefore, the air-fuel mixture supplied to the first cylinder group 7a is enriched with respect to the stoichiometric point. This allows the first catalytic converter 25 to promote reduction of the NOx component of the gases exhausted from the first cylinder group 7a efficiently. The exhaust gases which still include the HC and CO components are mixed with the fresh air pumped from the deactivated cylinder 7b. This allows the second catalytic converter 27 to promote oxidation of the HC and CO compoennts efficiently. The heat of reaction causes the temperature of the second catalytic converter 27 to increase, and keeps the second catalytic converter 27 active. If the detected temperature becomes above the reference temperature during the partial cylinder mode, the engine is again feedback controlled by the signal from the first exhaust gas sensor 24 as described before. Thus, the temperature of the second catalytic converter 27 is maintained at a high level during the partial cylinder mode so that the second catalytic converter 27 can purify the exhaust gas efficiently when the cylinder mode is switched from the partial to the full cylinder mode (while minimizing the use of the rich burn operation which is not as efficient for fuel economy as the feedback operation).

Figure 6:
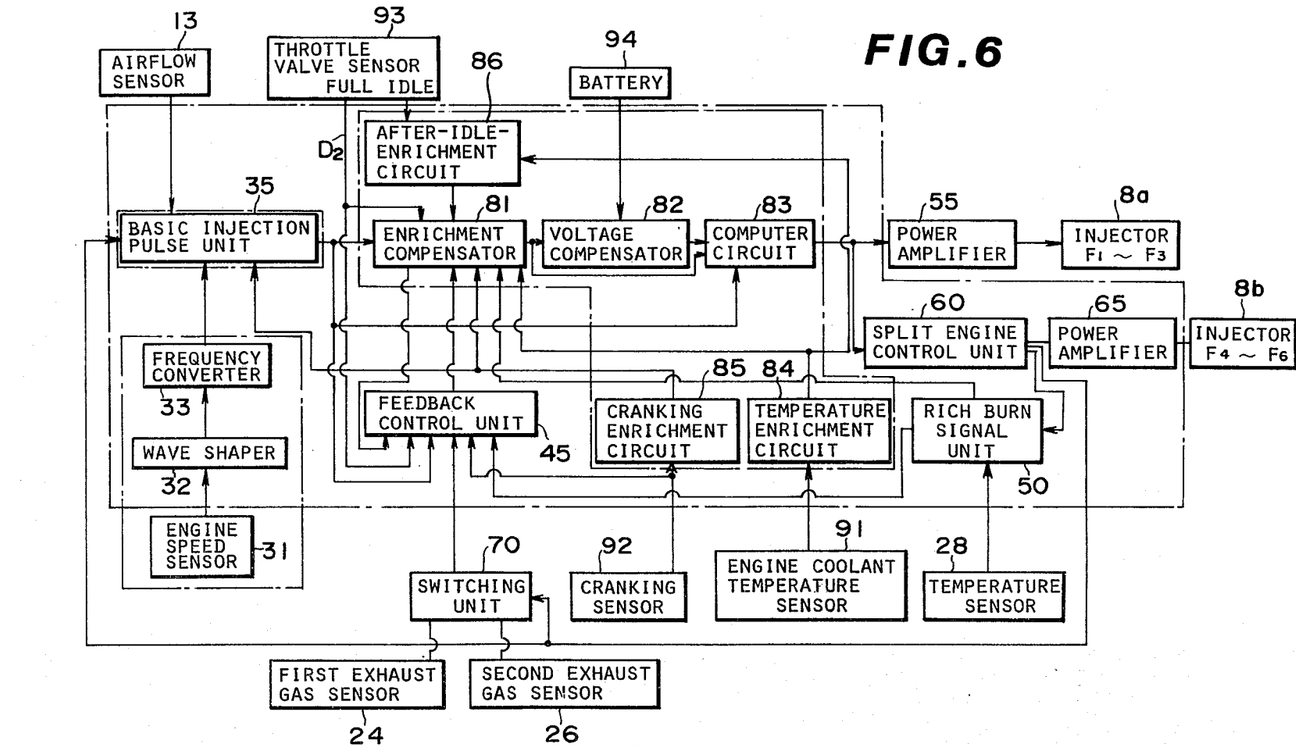
FIG. 6 is a more detailed illustration of the circuit diagram of FIG. 2.

FIG. 6 is a more detailed illustration of the control circuit 30 shown in FIG. 2. The engine speed sensor 31 includes the engine ignition coil 9, a wave shaper 32, and a frequency converter 33. The compensator unit 40 includes an enrichment compensator 81, a voltage compensator 82, and a computer circuit 83. The compensator unit 40 also includes a temperature-enrichment circuit 84, a cranking-enrichment circuit 85, and an after-idle-enrichment circuit 86. These enrichment circuits 84 to 86 take their inputs from an engine coolant temperature sensor 91, a cranking sensor 92 and an idle position contact of a throttle valve sensor 93, and output signals to the enrichment compensator 81. The enrichment compensator 81 takes another input from a full position contact of the throttle valve sensor 93. The voltage compensator 82 takes its input from the battery 94. According to those signals, the enrichment compensator 81 and the voltage compensator 82 compensates the pulse width of the basic injection pulse as described before. The signals from the cranking sensor 92 and the full position contact of the throttle valve sensor 93 are supplied along lines D1 and D2, respectively, to the feedback control unit 45 so as to suspend the feedback control operation when the engine is in the cranking mode or full throttle condition.

Figure 7:
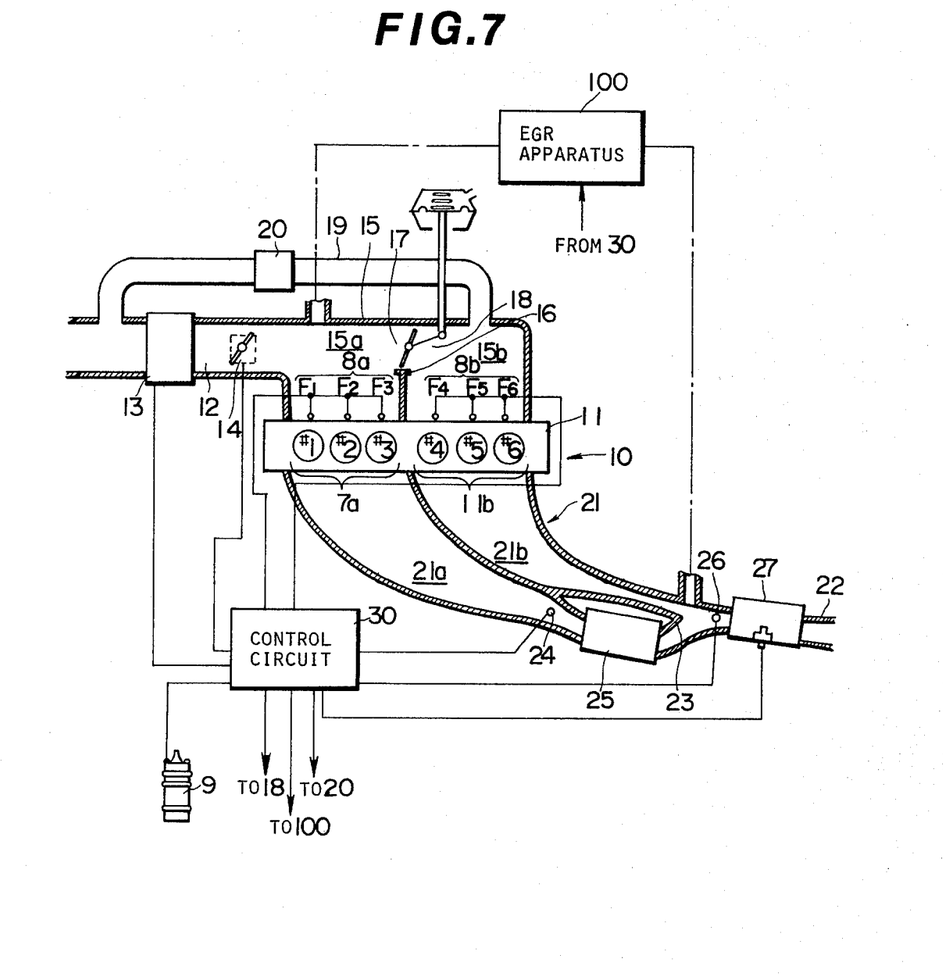
FIG. 7 is a schematic view of another preferred embodiment according to the present invention.

FIG. 7 schematically illustrates another preferred embodiment according to the present invention. This embodiment has an exhaust gas recirculation (EGR) apparatus 100 which introduces the exhaust gases into the intake passage 15 from the common downstream exhaust passage 22, and has only the first exhaust gas sensor 24 disposed in the first upstream exhaust passage 21. The first converter 25 is a three-way catalytic converter, and the second converter 27 is an oxidation catalytic converter or a three-way catalytic converter.

When the engine is operated on full cylinder mode, the EGR apparatus 100 introduces exhaust gases into the intake passage 15 so as to reduce the NOx components of the exhaust gases. And the first and the second catalytic converters 25, 27 oxidize the HC and CO components of the exhaust gases.

When the engine is operated on partial cylinder mode, the EGR apparatus 100 stops introducing the exhaust gases into the intake passage 15, and the engine is feedback controlled based on the signal from the first exhaust gas sensor 24. If the temperature of the second catalytic converter 27 is below the reference temperature, the engine is operated so as to perform the rich burn operation as described before.

As many possible embodiments of the present invention may be made without departing from the spirit and scope thereof, it is to be distinctly understood that the foregoing description of certain perferred embodiments is to be interpreted merely as illustrative of the present invention and not as a limitation.

What is claimed is:

1. A split engine control system, comprising:
   (a) a plurality of cylinders separated into first and second cylinder groups;
   (b) a split engine control means for operating said engine under light load conditions in a partial cylinder mode in which only said first cylinder group is activated and said second cylinder group is deactivated and allowed to pump air therethrough, and for operating said engine under relatively heavy load conditions in a full cylinder mode in which said first and second groups are activated;
   (c) first and second upstream exhaust passages for passing gases exhausted from said first and second cylinder groups, respectively, to a common junction;
   (d) a common downstream exhaust passage connected to said common junction for passing said gases therethrough to the atmosphere;
   (e) a first exhaust gas sensor and a first catalytic converter disposed in said first upstream exhaust passage;
   (f) a second catalytic converter disposed in said common downstream exhaust passage;
   (g) a temperature sensor for detecting the temperature of said second catalytic converter;
   (h) a feedback control means responsive to a signal from said first exhaust gas sensor for maintaining the ratio of the air-fuel mixture supplied to said first cylinder group at the stoichiometric point; and
   (i) a first means responsive to a signal from said temperature sensor for disabling said feedback control means and controlling the ratio of the air-fuel mixture supplied to said first cylinder group at a point which lies to the rich side of the stoichiometric point when the temperature of said second catalytic converter is below a predetermined level during the partial cylinder mode.

2. A split engine control system as recited in claim 1, wherein said feedback control means is also responsive to a signal from a second exhaust gas sensor disposed in said common downstream exhaust passage during the full cylinder mode of operation.

3. A split engine control system as recited in claim 1, further comprising; an exhaust gas recirculation system which is activated during the full cylinder mode, and a second means for disabling said feedback control means during the full cylinder mode.

4. A split engine control system as recited in claim 1, further comprising; an air intake passage provided therein with an airflow sensor and a throttle valve and divided downstream of said throttle valve into first and second branches, communicating with said first and second cylinder groups respectively, a first stop valve provided in said second branch for shutting off same during the partial cylinder mode, a bypass passage connecting said intake passage upstream of said air flow sensor and said throttle valve to said second branch downstream of said first stop valve, and a second stop valve disposed in said bypass passage for shutting off same during the full cylinder mode.

5. A split engine control system as recited in claim 2, further comprising; an air intake passage provided therein with an airflow sensor and a throttle valve and divided downstream of said throttle valve into first and second branches, communicating with said first and second cylinder groups respectively, a first stop valve provided in said second branch for shutting off same during the partial cylinder mode, a bypass passage connecting said intake passage upstream of said air flow sensor and said throttle valve to said second branch downstream of said first stop valve, and a second stop valve disposed in said bypass passage for shutting off same during the full cylinder mode.

6. A split engine control system as recited in claim 3, further comprising; an air intake passage provided therein with an airflow sensor and a throttle valve and divided downstream of said throttle valve into first and second branches, communicating with said first and second cylinder groups respectively, a first stop valve provided in said second branch for shutting off same during the partial cylinder mode, a bypass passage connecting said intake passage upstream of said air flow sensor and said throttle valve to said second branch downstream of said first stop valve, and a second stop valve disposed in said bypass passage for shutting off same during the full cylinder mode.

* * * * *